United States Patent [19]

Rudner et al.

[11] 4,139,501

[45] Feb. 13, 1979

[54] PRODUCTION OF POLYURETHANE FOAM OF REDUCED TENDENCY TO FORM EMBERS WHEN BURNED

[75] Inventors: Bernard Rudner, Ridgewood; Thomas M. Noone, Little Ferry, both of N.J.; Peter D. Pauly, Mountaintop, Pa.

[73] Assignee: Tenneco Chemicals, Inc., Saddle Brook, N.J.

[21] Appl. No.: 843,601

[22] Filed: Oct. 19, 1977

Related U.S. Application Data

[63] Continuation-in-part of Ser. No. 589,522, Jun. 23, 1975, abandoned.

[51] Int. Cl.$^2$ .............................................. C08G 18/32
[52] U.S. Cl. .......................... 521/136; 260/45.8 NT; 521/166; 521/115; 521/118
[58] Field of Search ..................... 260/2.5 AQ, 2.5 AJ, 260/2.5 BF, 45.8 NT

[56] References Cited

U.S. PATENT DOCUMENTS

| | | | |
|---|---|---|---|
| 3,041,293 | 6/1962 | Polacek | 260/2.5 AJ |
| 3,135,707 | 6/1964 | Nyquist et al. | 260/2.5 AQ |
| 3,257,337 | 6/1966 | Schoepfle et al. | 260/2.5 AJ |
| 3,265,668 | 8/1966 | Dowbenko et al. | 260/2.5 AQ |
| 3,328,321 | 6/1967 | Wismer et al. | 260/2.5 AQ |
| 3,645,923 | 2/1972 | Kan | 260/2.5 BF |
| 3,654,190 | 4/1972 | Levine | 260/45.8 NT |
| 3,723,366 | 3/1973 | Kan | 260/2.5 BF |
| 3,810,862 | 5/1974 | Mathis et al. | 260/45.8 NT |
| 3,891,578 | 6/1975 | Kan et al. | 260/2.5 BF |
| 3,897,372 | 7/1975 | Kehr et al. | 260/2.5 AJ |

*Primary Examiner*—Eugene C. Rzucidlo
*Attorney, Agent, or Firm*—John Boustead; James P. Scullin

[57] ABSTRACT

Flexible polyurethane foam having reduced tendency to form burning embers when it is ignited and burned is provided by incorporating into the reaction mixture before foaming a derivative of melamine wherein one or more hydrogens have been replaced by hydroxymethyl and/or lower alkoxymethyl groups.

In one embodiment, flexible polyurethane foams of increased flame retardance are also provided, by also incorporating a halogenated phosphorus ester into the reaction mixture before foaming.

16 Claims, No Drawings

PRODUCTION OF POLYURETHANE FOAM OF REDUCED TENDENCY TO FORM EMBERS WHEN BURNED

This is a continuation-in-part of our copending application Ser. No. 589,522 filed June 23, 1975, now abandoned.

BACKGROUND OF THE INVENTION

Flexible, resilient, polyurethane foams can be made by reacting a polyol and a polyisocyanate in the presence of a blowing agent. The foams can be used for a wide variety of purposes, such as carpet underlay, textile innerlining, furniture padding, crash pads in automobiles, mattresses, pillows and insulation. Polyurethane foams can burn readily when ignited. The present invention provides a method whereby there can be manufactured a flexible, resilient, polyurethane foam of reduced tendency to produce burning embers when burned. This is an important advantage, inasmuch as the spreading of the fire is reduced.

SUMMARY OF THE INVENTION

This invention provides a flexible, resilient, polyurethane foam of reduced tendency to form burning embers when burned.

The invention is provided by incorporating into the reaction mixture before foaming a hydroxymethyl or lower alkoxymethyl derivative of melamine, for example, tris-(hydroxymethyl) melamine or hexa-(methoxymethyl) melamine.

In a more limited aspect, the invention also provides a flexible, resilient, polyurethane foam of increased flame retardance. This is accomplished by also incorporating into the reaction mixture to be foamed a halogenated phosphorus ester.

In contrast to prior art processes, such as that disclosed by Nyquist et al in U.S. Pat. No. 3,135,707, which incorporate certain partially alkylated polymethylolmelamines or other similar thermosetting resin precursors into polyurethane foam reaction mixtures for the purpose of increasing the rigidity and/or load-bearing capacity of the resultant foam by causing resinification of the resin precursor during manufacture, the process of the present invention has as an objective the manufacture of flexible polyurethane foam which has a reduced propensity to form incendiary embers when burned. In this process, resinification of the melamine during manufacture of the foam is avoided.

The novel products of this invention, rather than being stiff and rigid, retain substantially the flexibility, resilience, cell structure, permeability, and hand of conventional flexible polyurethane foams which do not contain the melamine derivatives employed in the present process. As a consequence, the foams of this invention can be used in most or all of the applications where conventional flexible foams have heretofore been used. These novel foams can, if desired, be peeled, split, or sliced into sheets of any desired thickness using techniques well-known in the art, and the flexible sheets also can be rolled up for convenient storage and transportation. Like conventional flexible polyurethane foams, the products of the present process can be laminated to textiles or plastic substrates by conventional methods, such as flame-lamination or by means of adhesives.

Although the foams of this invention have the appearance and flexibility of conventional foams, once they are ignited they have a greatly reduced tendency to form burning embers. As is well known, one of the disadvantages of conventional polyurethane foams and other synthetic polymers is the fact that when they are ignited they tend to melt and form burning embers which can drip and cause the spread of flames to other nearby materials. Even when such materials contain flame-retardants they can still produce smoldering, dripping embers which can ignite nearby materials which are not flame-retardant. While we are not bound by any particular mechanism to explain the reduction in the tendency to form burning embers, one such mechanism may be the resinification of the melamine derivative under the influence of the heat of combustion to form a thermoset material within the foam structure which results in a lesser tendency to melt and drip.

In a more limited embodiment of the present invention, the reaction mixture to be foamed can also comprise one or more known flame retardants such as halogenated phosphorus esters. When such flame retardants are used, the finished foams support combustion for a shorter period of time after ignition, in addition to having a reduced tendency to produce burning embers during the time combustion does occur.

DETAILED DESCRIPTION OF THE INVENTION

The object of this invention is accomplished by incorporating into the mixture to be foamed one or more compounds of the formula

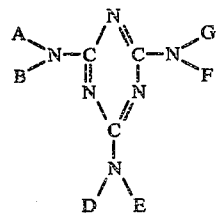

in amount sufficient to reduce the formation of incendiary embers when the foam is burned. In the preceding formula, A,B,D,E,F and G are hydrogen, hydroxymethyl (methylol) or $ROCH_2$—wherein R is an alkyl radical containing from one to four carbon atoms, such as methyl, ethyl or t-butyl. At least one of A,B,D,E,F and G is hydroxymethyl or $ROCH_2$—. Specific compounds falling within the scope of the formula are tris-(hydroxymethyl) melamine, tris-(hydroxymethyl)-tris-(methoxymethyl) melamine, hexa-(methoxymethyl) melamine, hexa-(hydroxymethyl) melamine, monohydroxymethyl melamine and tetra-(n-butoxymethyl) melamine. In general, the amount of compound or compounds of the formula used will be from one to about 20 percent by weight, based upon the weight of the polyol present in the mixture to be foamed.

The mixture to be foamed will also include a polyol, an organic polyisocyanate and a blowing agent. The polyol can be one or more polyether polyols, one or more polyester polyols, or a mixture of one or more polyether polyols and polyester polyols.

The polyols suitable for use in the present invention can be polyether polyols, such as those made by the addition of an excess of propylene-1,2-oxide to hexane triol, trimethylolpropane, glycerol, triethanolamine or a polyethylene glycol. Also, the polyols suitable for use in this invention can be polyester polyols or a mixture of polyester polyols and polyether polyols. The polyester polyol can be prepared, for example, by reacting a dicarboxylic acid, such as adipic acid, with a mixture of a diol, such as diethylene glycol, and a triol, such as glycerol.

The polyether polyol can also be selected from any of the wide variety of polyhydric polyether compounds available and conventionally used by the art for the preparation of flexible polyether-type polyurethanes. The most common polyether polyol compounds, the polyoxyalkylene polyether polyols, are generally prepared by the reaction of an alkylene oxide, such as propylene-1,2-oxide, with a polyhydric initiator or starter. The polyhydric initiator or starter can be, for example, glycerol, trimethylolethane, trimethylolpropane, triethanolamine or a polyethylene glycol.

The alkylene oxides used in preparing the polyethers preferably are those which contain from two to four carbon atoms, for example, ethylene oxide, 1,2-propylene oxide, 1,2-butylene oxide, trimethylene oxide and tetramethylene oxide. Also useful are the poly(aralkylene ether) polyols which are derived from the corresponding aralkylene oxides such as, for example, styrene oxide, alone or mixed with an alkylene oxide. Generally, propylene oxide, i.e., the 1,2-propylene oxide, and mixtures of 1,2-propylene oxide with ethylene oxide, are preferred for the preparing of the polyether polyol reactant.

The polyethers for use in the present invention preferably have a molecular weight of from about 500 to about 6500 and optimally of from about 2800 to about 4600 and an average hydroxy functionality of at least 2.5 to about 3.1.

The polyester polyol reactants useful in the present invention include any conventionally used in the preparation of flexible and semi-flexible urethane polymer foams. The polyhydric polyester reactant usually has a molecular weight of at least about 400 and optimally between about 500 and about 5000. The hydroxyl number of the compound is correspondingly in the range of from about 15 to about 300. The preferred average hydroxyl functionality for the polyester resins is from about 2.2 to 2.8.

The range of polyester polyol compounds useful for preparing the flexible polyurethane foams in the present invention is well known to the art, and the polyester polyol compounds can be prepared by, for example, the reaction of a polyhydric alcohol with a polycarboxylic acid compound, each containing from two to about 36 or more carbon atoms in the molecule. The polycarboxylic acid includes such acid precursors as the corresponding acid anhydrides or acid halides or even, for example, alkyl esters. The preferred acids are the dicarboxylic acids containing from 4 to 36 carbon atoms in the molecule. Examples of such preferred carboxylic acid compounds which can be used include, for example, aromatic acids, such as phthalic acid, terephthalic acid, isophthalic acid, tetrachlorophthalic acid, cycloaliphatic acids such as dimerized linoleic acid, maleated and fumarated resin acids, and cyclohexane-1,4-diacetic acid, but especially the aliphatic acids such as itaconic, oxydipropionic, succinic, glutaric, adipic, azelaic, suberic and sebacic acids, or combinations or such acids. The polyester polyols can also be prepared from the corresponding lactones, such as gamma-butyrolactone or epsiloncaprolactone, for example, by self-condensation on a diol-triol initiator.

The polyhydric alcohol used in the preparation of the polyester polyol is generally a mixture of a dihydric and a trihydric alcohol. Preferably, a mixture of polyols, the major portion having a functionality of two and the minor a functionality of three, is used. This mixture of di- and tri-functional polyols is utilized to give an average functionality of between two and three. A functionality of greater than two is desirable to provide crosslinking in the reaction between the polyester polyol and the polyisocyanate to form a flexible, but strong foam. It has been found to be preferable to obtain this additional functionality by using trihydric or higher polyols in a minor amount when forming the polyester polyol.

It is recognized that certain compounds which are considered by those skilled in the art as polyester resins also contain ether linkages, e.g., esters prepared from dipropylene glycol. However, the primary character of such resins is considered to be that of an ester.

The organic polyisocyanates useful in the present invention are also conventional. They contain at least two isocyanate groups per molecule. Preferably, the isocyanate mixture selected has an isocyanate functionality of from 2.0 to 3.0. The useful isocyanates are the aromatic polyisocyanates, alone or admixed with aliphatic, cycloaliphatic or heterocyclic polyisocyanates.

The aromatic diisocyanates are generally the least expensive and most suitable polyisocyanates available. The aromatic diisocyanates, especially the toluene diisocyanate isomers, are used commercially in the preparation of foam by the one-shot, continuous slab-stock process. However, for certain purposes, other polyisocyanates, especially the aliphatic, aralkyl and cycloalkyl polyisocyanates, have valuable properties and can be used, if desired, in admixture with, e.g., toluene diisocyanates. The aralkyl, aliphatic and cycloaliphatic polyisocyanates are especially useful when resistance against degradation and discoloration due to oxidation or light is needed. The non-aryl polyisocyanates are generally not useful alone, but can be used in combination with the other types for special purposes.

Suitable organic polyisocyanates include, for example, n-butylene diisocyanate, methylene diisocyanate, m-xylyl diisocyanate, p-xylyl diisocyanate, cyclohexyl-1, 4-diisocyanate, dicyclohexylmethane-4, 4'-diisocyanate, m-phenylene diisocyanate, p-phenylene diisocyanate, 3-(alphaisocyanatoethyl)-phenyl isocyanate, 2,6-diethylbenzene-1, 4-diisocyanate, diphenyldimethylmethane-4, 4'-diisocyanate, ethylidene diisocyanate, propylene-1,2-diisocyanate, cyclohexylene-1, 2-diisocyanate, 2,4-toluene diisocyanate, 2,6-toluene diisocyanate, 3,3'-dimethyl-4'-biphenylene diisocyanate, 3,3'-dimethoxyl-4,4'-biphenylene diisocyanate, 3,3-diphenyl-4,4'-biphenylene diisocyanate, 4,4-biphenylene diisocyanate, 3,3'-dichloro-4,4'-biphenylene diisocyanate, 1,5-naphthalene diisocyanate, isophorone diisocyanate, m-xylylene diisocyanate, triazine triisocyanate, triketotrihydrotris(isocyanatophenyl) triazine and tris-(isocyanatephenyl) methane.

Generally, in carrying out the urethane polymerization reactions, the only significant groups in the reactant compounds are the isocyanate groups and active hydrogen groups which are reactive therewith. Acyclic, alicyclic, aromatic and heterocyclic radicals are all possible substituents on the active hydrogen and polyisocyanate reactants.

The preferred blowing agent for general use in the production of the flexible polyurethane foam is water. The advantages of using water are low cost and the stability which the use of water adds to the foam-making. The water-isocyanate reaction gives not only gas for blowing, but also produces urea-containing polymer very quickly, contributing materially to early polymer strength needed to hold the gas inside, to form foam. Generally, when water is used, it is present in proportions of from about 0.5 to about 6 weight percent of water based on the total weight of the reacting polyols. Blowing agents which do not react with the isocyanate can be used as an adjunct with water or as a total replacement of water. These include compounds which are vaporized at the temperatures produced by the exotherm of the isocyanate-reactive hydrogen reaction. The various blowing agents are well known in the art and constitute no part of the present invention. Other blowing agents that are preferably used by the art include certain halogen-substituted aliphatic or cyclo-aliphatic hydrocarbons having boiling points between about $-40°$ C. and $+70°$ C., including methylene chloride; the volatile fluorocarbons, such as trichloromonofluoromethane, dichlorodifluoromethane, and 1-chloro-2-fluoroethane; low boiling hydrocarbons such as n-propane, cyclopropane, butane, isobutane, pentane, hexane, cyclohexane and their mixtures and the like.

In accordance with the present invention, there can also be produced a flexible polyurethane foam of increased flame retardant properties by including in the reaction mixture to be foamed one or more halogenated phosphorus esters, for example, tris(1,3-dichloropropyl) phosphate, tris(2,3-dibromopropyl) phosphate, dichloromethylene-bis[di(2-chloroethyl) phosphate], tris-(2-chloroethyl) phosphate, and tris-(2-chloropropyl) phosphate. The amount of flame retardant used will generally be up to about 30 percent by weight, and preferably from four to 20 percent by weight, based upon the weight of the polyol present in the reaction mixture to be foamed.

The following Examples illustrate the invention or provide comparisons with respect thereto, and are to be considered not limitative of the invention.

EXAMPLES 1 to 4

These four examples represent the preparation of hand batch formulations using the one shot technique.

In each example 100 grams of a polyol which was a glycol adipate having a molecular weight of 3000 was weighed out in a cup. An activator comprising of the following ingredients was then added: water, 3.7 grams; proprietary hot amine coupler, 2.0 grams; and N-ethyl morpholine, b 1.5 grams. Amine catalyst, 0.3 grams; black paste (carbon black in tricresylphosphate), 7.5 grams; catalyst(N-cocomorpholine), 0.8 grams; mineral oil, 0.2 grams; flame retardants; and stannous octoate catalyst, 0.2 grams, were added in that order.

In Example 1 the flame retardant was composed of 13.3 grams of Fyrol CEF [tris-(2-chloroethyl) phosphate] and 6.7 grams of tris(hydroxymethyl) melamine. In Example 2 the flame retardant was composed of 20.0 grams of the same halogenated phosphate. In Example 3 the flame retardant was composed of 20.0 grams of tris-(hydroxymethyl) melamine, and in Example 4 no flame retardant was used.

The premixes prepared as described were each combined with 49.8 grams of toluene diisocyanate (65/35) (index 111) and after about five seconds of mixing were poured into an 8 inch by 8 inch mold. The rise times were about 60 seconds and each foam had a density of about two pounds per cubic foot.

When the four cured and conditioned foams were ignited by the same standardized test procedure (ASTM 1692–68), the following results were obtained:

TABLE I

| Example | 1 | 2 | 3 | 4 |
|---|---|---|---|---|
| Time to loss of flame (secs) | 32 | 28 | No loss of flame | |
| Extent of burn damage (inches) | 1.1 | 1.1 | 5.0 | 5.0 |
| Dripping embers during burning | None | Many glowing | None | Many glowing |

EXAMPLES 5 to 32

A series of foams were prepared as in Examples 1 to 4, but containing various flame retardants, alone and in combination with either the melamine derivatives of this invention or commercially available products recommended as intumescent agents. All cured foams were ignited under two standardized sets of conditions: by ASTM 1692–68; and, after being aged, by a modification of UL 94. The latter test allows for a better observation of dripping ember formation. The modification of UL 94 was in the measurement of flame time. The standard test calls for starting to count flame time 60 seconds after ignition, whereas in the procedure used flame time was counted from the start of ignition.

TABLE II

| | | Ignition Test Results | | | | |
|---|---|---|---|---|---|---|
| | | ASTM 1692-68 | | UL 94 | | |
| Ex. No. | Foam Additives, phr | Secs. Time to flame extinguishment | Inches Burn Extent | Secs. Flame Time | Ins. Damage | Flaming Embers |
| 5 | None (control) | Sample consumed | | Sample consumed | | Yes |
| | Single Additives | | | | | |
| 6 | CEF, 20 (A) | 67 | 2.08 | 50 | 1.42 | Yes |
| 7 | FR 2, 20 (B) | 29 | 2.38 | 50 | 1.75 | Yes |
| 8 | TM 101, 20 (C) | 52 | 1.71 | 40 | 1.12 | Yes |
| 9 | 2XC-20,20 (D) | 62 | 2.46 | 44 | 1.38 | Yes |
| 10 | Dibutyl Chloroendate, 10 (E) | Sample consumed | | Sample consumed | | Yes |
| 11 | Melamine, 10 (F) | Sample consumed | | Sample consumed | | Yes |
| 12 | Tris(hydroxymethyl) melamine, 10 (G) | Sample consumed | | Sample consumed | | No |
| 13 | Tris(hydroxymethyl)-tris (methoxymethyl) melamine 12.5 (H) | Sample consumed | | 63 | 2.54 | No |
| 14 | Hexa(methoxymethyl) melamine (I) | Sample consumed | | 66 | 1.96 | No |
| | Double Additives | | | | | |
| 15 | A,20; F,10 | 50 | 1.13 | 42 | 1.08 | Yes |

TABLE II-continued

| Ex. No. | Foam Additives, phr | Ignition Test Results | | | | |
|---|---|---|---|---|---|---|
| | | ASTM 1692-68 | | UL 94 | | |
| | | Secs. Time to flame extinguishment | Inches Burn Extent | Secs. Flame Time | Ins. Damage | Flaming Embers |
| 16 | A,20; E,10 | 60 | 1.17 | 50 | 1.46 | Yes |
| 17 | A,20; H,12.5 | 34 | 1.08 | 32 | 1.12 | No |
| 18 | A,20; I,10 | 50 | 1.17 | 36 | 1.04 | No |
| 19 | B,20; G,10 | 42 | 0.96 | 48 | 1.04 | No |
| 20 | B,20; H,12.5 | 28 | 0.96 | 32 | 1.00 | No |
| 21 | B,20; I,10 | 40 | 1.29 | 41 | 1.50 | No |
| 22 | B,20; F,10 | 52 | 1.5 | 45 | 1.38 | Yes |
| 23 | B,15.2; H,18.5 | 35 | 0.96 | 35 | 1.08 | No |
| 24 | B,10, I,20 | 52 | 1.71 | 41 | 1.25 | No |
| 25 | C,20; E,10 | 42 | 1.21 | 44 | 1.08 | Yes |
| 26 | C,20; G,10 | 42 | 0.75 | 41 | 0.79 | No |
| 27 | C,20; H,12.5 | 37 | 0.96 | 31 | 0.96 | No |
| 28 | C,20; I,10 | 46 | 1.04 | 32 | 0.71 | No |
| 29 | D,20; G,10 | 35 | 0.88 | 41 | 1.04 | No |
| 30 | D,20; H,12.5 | 29 | 0.88 | 29 | 0.96 | No |
| 31 | D,20; I,10 | 34 | 0.88 | 35 | 0.96 | No |
| 32 | D,20; E,10 | 42 | 1.42 | 44 | 1.43 | Yes |

In Table II and wherever else used in this disclosure, phr means parts by weight per 100 parts by weight of polyol present in the mixture to be foamed. CEF is a proprietary tris-(2-chloroethyl) phosphate and is designated in Table II by the letter A. FR-2 is a proprietary tris-(1,3-dichloropropyl) phosphate and is designated in Table II by the letter B. TM 101 is a proprietary bis-[(chloroalkyl)phosphate] and is designated in Table II by the letter C. 2XC-20 is a proprietary dichloromethylene-bis [di(2-chloroethyl) phosphate] and is designated in Table II by the letter D. Further, in Table II dibutyl chlorendate, melamine, tris(hydroxymethyl)-tris-(methoxymethyl) melamine and hexa-(methoxymethyl) melamine are designated, respectively, by the letters E,F,G,H and I.

EXAMPLES 33 and 34

A commercially available flame retardant is claimed by its manufacturer to be a cross-linked condensate of hexa-(methoxymethyl) melamine and tris(2,3-dibromopropyl) phosphate. This flame retardant is a clear, strongly acidic liquid containing ionic halide. Attempts to neutralize the acidity (for improved foam-making) by cautious addition of bases gave useless precipitates.

Following essentially the procedure of Example 1, a lab foam was made using 13.3 phr of tris(2,3-dibromopropyl) phosphate and 6.7 phr of hexa-(methoxymethyl) melamine. The foam was somewhat darker in shade than the foam of Example 1, and slightly less open. When ignited according to the procedure of ASTM 1692-74, the initial flame burnt itself out within 21 seconds of the ignition, and the foam showed no dripping ember formation during the time of burning.

Exactly the same foam-making procedure was tried several times in which the combination of the dibromopropyl phosphate and the melamineformaldehyde derivative was replaced by the liquid condensate of the second preceding paragraph at 5–20 phr levels. In each attempt, no foam was obtained, even when excess amine catalyst was used to neutralize the added acidity. An attempt was made to concentrate the condensate and volatilize acidic components by holding the condensate under vacuum at ambient temperature. The resultant discolored sludge was still acidic, and failed to permit foam-making when used at a 5 or 10 phr level.

EXAMPLES 35 and 36

A commercially available black polyester-based polyurethane foam (Example 35) advertised as being "permanently flame retardant" is used extensively in sound-adsorption requirements in such mechanical applications as computer building and motor vehicle interiors. A commercial sample of this black foam was compared by the following tests with a plant-made foam (Example 36) having a formulation essentially as follows:

| | |
|---|---|
| Polyester prepared from diethylene glycol trimethylolethane and adipic acid | 100 parts by weight |
| 65/33 TDI (111 index) | 50.1 |
| Water | 2.5 |
| 12 percent by weight dispersion of carbon black in cresyl diphenyl phosphate | 7.45 |
| Stannous Octoate (1:1 by weight mixture in cresyl diphenyl phosphate | 0.78 |
| N-cocomorpholine (4:1 by weight in mineral oil) | 1.0 |
| Distilled dimethylhexadecylamine | 0.2 |
| N-ethyl-morpholine | 0.5 |
| Non-silicon cell control agent | 1.5 |
| Tris(hydroxymethyl)-tris(methoxymethyl) melamine | 6 |
| Tris(1,3-dichloropropyl) phosphate | 15 |

Foam 36 was comparable in color, cell uniformity, and physical properties to Foam 35, but had a pleasanter, less harsh, hand. Both showed comparable standing wave sound adsorption curves at equal thicknesses, and both satisfied the requirements for HF-1 (no drip) classification of the UL 94 ignition test, as freshly tested.

A. Laminatability

Occasionally the use of either foam in sound adsorbency necessitates a pre-lamination of the foam to textile or plastic. Both Foams 35 and 36 appear to be equally laminatable to both fibrous webs and thermoplastic (PVC) sheets by aqueous and non-aqueous adhesives, although, in general, Foam 35 gives a slightly poorer bond than Foam 36. However, in laboratory trials, Foam 36 could be readily flame laminated to cellulosic fiber, while Foam 35 could not be.

Test B. Permanency of Flame Retardancy

The two foams were ignited by the procedure of UL 94, and the results noted in Table III. Fresh samples of both foams were simultaneously immersed in separate beakers of boiling water for 10 minutes and for 30 minutes, and were dried by air at the same controlled temperatures and humidities for 48 hours before being retested by the procedure of UL 94.

TABLE III

|  | Foam 35 | Foam 36 |
|---|---|---|
| Original Materials | | |
| UL 94 Burn Distance, inches | 1.02 | 1.02 |
| UL 94 Burn Time, secs. | 29.3 | 29.2 |
| Embers Dripping | None | None |
| Cotton Ignition from Embers | No | No |
| UL 94 Classification | 94HF-1 | 94HF-1 |
| Material after 10 Minutes in Boiling Water | | |
| UL 94 Burn Distance, inches | 5.0 | 1.29 |
| UL 94 Burn Time, secs. | 98.5 | 28.8 |
| Embers Dripping | Yes | None |
| Cotton Ignition from Embers | Yes | No |
| UL 94 Classification | Failed | Classification 94HF-1 |
| Material after 30 Minutes in Boiling Water | | |
| UL 94 Burning Distance, inches | 5.0 | 1.38 |
| UL 94 Burning Time, secs. | 96.5 | 27.5 |
| Dripping Embers | Yes | None |
| Ignition of Cotton from Embers | Yes | No |
| UL 94 Classification | Failed | Classification 94HF-1 |

From the above Table III, it can be seen that the commercially available "permanently flame retardant" Foam 35 loses its retardancy by contact with boiling water (extraction), which does not affect Foam 36 of this invention.

Test C. Shelf Storage Stability

One criterion for shelf storage stability is the ability to resist the degradative effects of the nitrogen oxides generated by commonly used space heaters. The test most frequently used is the AATCC Fume Chamber Test No. 23-1962 which had the results shown in Table IV.

TABLE IV

|  | Foam 35 | Foam 36 |
|---|---|---|
| Original Material | | |
| Tensile strength, psi | 22 | 16 |
| UL 94 Burn Distance, inches | 1.02 | 1.02 |
| UL 94 Burn Times, secs. | 29.3 | 29.2 |
| Dripping Embers, Cotton Ignition | No, None | No, None |
| Material After Fume Chamber | | |
| Tensile Strength, psi | 7 | 11 |
| UL 94 Burn Distance, inches | 2.1 | 1.1 |
| UL 94 Burn Time, secs. | 43 | 30 |
| Dripping Embers, Cotton Ignition | A few, infrequent | No, None |

Thus, it can be seen that the nitrogen oxides encountered in storage are more damaging to Foam 35 than they are to Foam 36.

EXAMPLES 37 to 39

It is well-known that ether-based foams are more difficult to make flame-retardant than ester-based foams, and more difficult to make dripless if a high-resilient ether formulation is used. As a test of the invention, high-resilient slabstock foams were made with and without the additives of this invention and tested for flammability. Table V shows the three formulations in parts by weight.

TABLE V

|  | Foam 37 (Control) | Foam 38 | Foam 39 |
|---|---|---|---|
| 4000 mol. wt. polyol | 800 | 800 | 800 |
| Proprietary Isocyanate | 431.2 | 431.2 | 502.8 |
| Proprietary Cross-Linker | 40 | 40 | 40 |
| Triethanolamine | 40 | 40 | 40 |
| Mixture of triethylene diamine in dipropylene glycol (33:67 weight ratio) | 3.2 | 3.2 | 3.2 |
| Tris (1,3-Dichloropropyl) phosphate | 160 | 61.5 | 92.3 |
| Tris-(hydroxymethyl)-tris (methoxymethyl)-melamine | 0 | 98.5 | 147.7 |
| Foam Density, pounds per cubic foot | 3.4 | 3.2 | 2.4 |
| Foam Permeability (Dow), cubic feet per minute | 2.8 | 3.1 | 3.8 |
| Foam Appearance | Punky celled | Uniform | Uniform |
| ASTM 1692-68 Ignition: | | | |
| Burn time, secs. | 18 | 21.2 | 28.7 |
| Burn extent, inches | 0.67 | 0.42 | 0.92 |
| Dripping embers | Many, burning | None | None |

EXAMPLES 40 to 42

In Example 40, a foam was made using 200 grams of a proprietary ether polyol having an average molecular weight of 6000, 93.4 grams of a proprietary polyisocyanate (TDI index of 104), 15 grams of tris-(1,3-dichloropropyl) phosphate, 30 grams of hexa-(methoxymethyl) melamine, 5.35 grams of water and 20 grams of bis-(hydroxyethyl) dimethylhydantoin.

In Example 41, the procedure of Example 24 was repeated, but using 20 grams of tris-(1,3-dichloropropyl) phosphate and 40 grams of hexa-(methoxymethyl) melamine.

The foams of Examples 40 and 41 each had a cream time of 10 seconds, and densities of 2.82 and 2.9 pounds per cubic foot, air permeabilities (Dow) of 3.5 and 3.3 cubic feet per minute, and ASTM 1692-68 burn times of 61.9 and 67.1 seconds and burn extents of 2.7 and 3.0 inches, respectively. The foam of Example 40 dripped few burning embers, while the foam of Example 41 dripped very few burning embers.

Control foam Example 42 was made similarly to that of Example 40, but using 99.7 grams of the polyisocyanate, 20 grams of tris-(1,3-dichloropropyl) phosphate and no hexa-(methoxymethyl) melamine. The control foam had a cream time of 10 seconds, a rise time of 60 seconds, a density of 2.62 pounds per cubic foot, an air permeability (Dow) of 3.2 cubic feet per minute, and an ASTM 1692-68 burn time of 20.9 seconds and burn extent of 0.92 inch. The control foam dripped many burning embers, once ignited.

EXAMPLES 43 and 44

Small amounts of the additives of this invention serve to give more reproducible flame-retardant results even at concentrations where full char formation does not occur, tending to minimize the deleterious effects of inconsistent flame retardant concentrations and erratically spotty increases in cell permeability, such as is experienced in measuring the top, the middle, and the bottom of a bread slice. Pilot line buns of the following formulations were prepared, the amounts being in parts by weight:

|  | 43 | 44 |
|---|---|---|
| Ester Resin prepared from diethylene glycol, trimethylolethane and adipic acid | 100 | 100 |
| 65/35 TDI | 50.1 | 50.1 |
| Stannous Octoate (1:1 by weight | | |

-continued

|  | 43 | 44 |
|---|---|---|
| in cresyl diphenyl phosphate) | 0.4 | 0.4 |
| Water | 3.7 | 3.7 |
| Non-Silicon Surfactant | 1.5 | 1.5 |
| Pigment, Black Dispersion | 7.45 | 7.45 |
| N-Ethyl morpholine | 0.5 | 0.5 |
| Dimethyl hexadecyl amine | 0.5 | 0.5 |
| N-cocomorpholine (4:1 by weight in mineral oil) | 1.0 | 1.0 |
| Tris(1,3-Dichloropropyl) phosphate | 20.0 | 20.0 |
| Tris(Methoxymethyl)-tris(Hydroxymethyl) Melamine | — | 5.0 |
| Foam Density, pounds per cubic foot | 2.26 | 2.02 |

Bread slices of each foam were cut in sufficient number so that 10 UL 94 test samples each could be cut from identical places in the top, middle, and bottom thirds of each slice. Permeabilities were determined on each sample, and then half the number of samples from each location were subjected to UL 94 before, and the other half after storage at 70° C. for a week. The UL 94 results below in Table VI are therefore averages of 5 samples each, for each test.

TABLE VI

|  | Foam 43 | | | Foam 44 | | |
|---|---|---|---|---|---|---|
| Original Material | | | | | | |
| Permeability: cubic feet per minute | | | | | | |
| Top (T) | 2.14 | | | 1.98 | | |
| Middle (M) | 2.13 | | | 2.00 | | |
| Bottom (B) | 2.21 | | | 2.03 | | |
|  | T | M | B | T | M | B |
| Ignition Test: | | | | | | |
| Burn time, secs. | 53.5 | 49.7 | 45.3 | 44.0 | 41.5 | 45.3 |
| Burn extent, inches | 2.30 | 2.12 | 1.7 | 1.59 | 1.30 | 1.19 |
| Dripping Embers | Yes | Yes | Yes | No | No | No |
| Embers Ignite Cotton | No | No | No | No | No | No |
| Sample Burn Failures | 3of5 | 1of5 | 0of5 | 0of5 | 0of5 | 0of5 |
| Aged Material | | | | | | |
| Ignition Burn Time, secs. | 53.4 | 43.7 | 44.0 | 45.5 | 44.6 | 44.7 |
| Burn extent, inches | 2.23 | 1.87 | 1.59 | 1.36 | 1.31 | 1.27 |
| Dripping Embers | Yes | Yes | Yes | No | No | No |
| Embers Ignite Cotton | No | No | No | No | No | No |
| Sample Burn Failures | 2of5 | 1of5 | 0of5 | 0of5 | 0of5 | 0of5 |

From Table VI, it can be seen that the additive of this invention not only improves flame retardancy, but makes the foam more uniform, from top to bottom, in both permeability and flame retardancy.

EXAMPLES 45 to 47

While the instant invention shows to excellent advantage in flame retardancy, another desirable use is to control the stiffness, or hand, of the foam, at will.

Three highly open, primarily ester-resin-based foams are made essentially according to the procedure of U.S. Pat. No. 3,884,848, issued May 20, 1975, naming Ricciardi, Cordora and Smudin as inventors, using the following formulations:

TABLE VII

|  | Foam 45 | Foam 46 | Foam 47 |
|---|---|---|---|
| Ester resin derived from diethylene glycol, trimethylol propane and adipic acid | 90 pbw | 90 pbw | 90 pbw |
| Propoxylated glycerol | 10 | 10 | 10 |
| Toluene Diisocyanate (80/20) | 45.1 | 48.1 | 49.1 |
| Silicon Surfactant | 3.2 | 3.2 | 3.2 |
| Stannous Octoate (1:1 by weight in cresyl diphenyl phosphate | 0.45 | 0.45 | 0.45 |
| Pigment Black Dispersion | 3.0 | 3.0 | 3.0 |
| N-ethyl morpholine | 0.1 | 0.1 | 0.1 |
| Triethylenediamine (33 percent by weight in lipropylene glycol) | 0.4 | 0.4 | 0.4 |
| Water | 3.58 | 3.58 | 3.58 |
| Octadecyl methacrylate | 3.0 | 3.0 | 3.0 |

TABLE VII-continued

|  | Foam 45 | Foam 46 | Foam 47 |
|---|---|---|---|
| Tris(hydroxymethyl) melamine | — | 10.0 | 10.0 |
| Benzophenone Tetracarboxylic Dianhydride | — | — | 3.0 |

All three foams are essentially equal in physical properties, including hand, density and appearance, of quality and appearance most useful in making textile linings of uniformly delustered grey attractiveness. In the laboratory, the three are essentially equal in flame laminatability, but with Foam 47 giving a slightly crisper hand (as desired in U.S. trade) than Foams 45 and 46. When the laminates are heat-cured, as on heated rolls or in ovens for less than 5 minutes at or above 300° F., then the Foam 46 laminate becomes crisper than the Foam 45 laminate, and the Foam 47 becomes sturdy in hand.

EXAMPLES 48 to 50

Three industrial grade lab foams are made using the following ingredients in parts by weight:

|  | Parts |
|---|---|
| Polyester derived from diethylene glycol, trimethylolpropane, and adipic acid: mol. wt. 2000, hydroxyl no. 52 | 85.0 |
| Propoxylated glycerol: mol. wt. 3500, hydroxy no. 48 | 7.0 |
| Tolylene diisocyanate (80/20)* | 49.4 |
| Ethoxypropoxylated polysiloxane | 3.5 |
| Polydimethylsiloxane (viscosity 50cs) | 0.6 |
| Water | 3.5 |
| Stannous octoate solution, 50% in tricresyl phosphate | 0.2 |
| N-ethylmorpholine | 0.1 |
| Triethylenediamine solution, 33% in dipropylene glycol | 0.25 |
| Brown pigment dispersion in tricresyl phosphate | 3.0 |
| Tribromoneopentyl alcohol solution, 60% in 3000 mol. wt. propoxylated glycerol | 20.0 |

*80/20 weight ratio of 2,4- and 2,6-tolylene diisocyanate.

Foams 49 and 50 also contained in the following additional ingredients in parts by weight:

|  | Foam 49 | Foam 50 |
|---|---|---|
| Tris(hydroxymethyl) melamine | 15 | 15 |
| Hydroxylatd epoxy resin | 0 | 5 |

All three foams before oven cured are essentially equally firm, but after being oven cured (200 degrees F., one-half hour) Foam 49 is slightly and Foam 50 somewhat less limp, in thin sections, than is Foam 48. Oven curing each foam at 300 degrees F. for three minutes accentuates the firmness differences, with Foam 50 alone becoming self-standing in one inch thicknesses. All three foams with or without added heat treatment show essentially equal dust filtration capacities. In UL 94-type ignition tests, Foam 48 shows about the same time and extent of burn as does Foams 49 and 50, but unlike those two, drips burning embers that ignite cotton.

What is claimed is:

1. In a process for the manufacture of a flexible, resilient, polyurethane foam by the reaction of a polyol and an organic polyisocyanate in the presence of a blowing agent, the amount of said organic polyisocyanate being at least one equivalent per equivalent of the total of said polyol and said blowing agent, the step of incorporating into the mixture to be foamed at least one compund of the formula

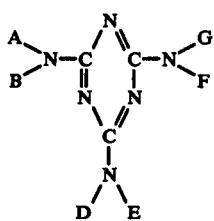

in amount sufficient to reduce the formation of incendiary embers when the foam is burned, in the preceding formula A, B, D, E, F and G being selected from the group consisting of hydrogen, methylol and ROCH$_2$ —wherein R is an alkyl radical containing from one to four carbon atoms, with the proviso that in said formula at least one of A, B, D, E, F and G is methylol or ROCH$_2$ —, and wherein the amount of said compound is from one to about 20 percent by weight based upon the weight of said polyol.

2. The process of claim 1 wherein said compound is tris-(hydroxymethyl) melamine.
3. The process of claim 1 wherein said compound is tris-(hydroxymethyl)-tris-(methoxymethyl) melamine.
4. The process of claim 1 wherein said compound is hexa-(methoxymethyl) melamine.
5. The process of claim 1 wherein the mixture to be foamed also includes at least one halogenated phosphorus ester in amount sufficient to increase the flame retardant properties of the foam.
6. The process of claim 5 wherein the amount of said halogenated phosphorus ester is from four to twenty percent by weight, based upon the weight of the polyol.
7. The process of claim 5 wherein said halogenated phosphorus ester is tris-(2-chloroethyl) phosphate.
8. The process of claim 5 wherein said halogenated phosphorus ester is tris-(1,3-dichloropropyl) phosphate.
9. The product of the process of claim 1.
10. The product of the process of claim 2.
11. The product of the process of claim 3.
12. The product of the process of claim 4.
13. The product of the process of claim 5.
14. The product of the process of claim 6.
15. The product of the process of claim 7.
16. The product of the process of claim 8.

* * * * *